United States Patent [19]
Kazecki et al.

[11] Patent Number: 5,131,008
[45] Date of Patent: Jul. 14, 1992

[54] DSP-BASED GMSK COHERENT DETECTOR

[75] Inventors: Henry L. Kazecki, Des Plaines; Steven H. Goode, Palatine, both of Ill.

[73] Assignee: Motorola, Inc., Schaumburg, Ill.

[21] Appl. No.: 344,733

[22] Filed: Apr. 28, 1989

[51] Int. Cl.[5] .......................................... H04L 27/06
[52] U.S. Cl. ..................................... 375/97; 375/118
[58] Field of Search ................. 375/39, 118, 97, 98, 375/100, 102, 77, 90; 329/318

[56] References Cited
U.S. PATENT DOCUMENTS

| | | | |
|---|---|---|---|
| 3,800,228 | 3/1974 | Acker | 375/118 |
| 4,061,977 | 12/1977 | Motley et al. | 375/118 |
| 4,458,356 | 7/1984 | Toy | 375/39 |
| 4,466,108 | 8/1984 | Rhodes | 375/97 |
| 4,472,817 | 9/1984 | Poklemba et al. | 375/77 X |
| 4,712,222 | 12/1987 | Heard et al. | 375/97 |

Primary Examiner—Douglas W. Olms
Assistant Examiner—Tesfaldet Bocure
Attorney, Agent, or Firm—Joseph P. Krause

[57] ABSTRACT

An improved method and apparatus for demodulators for MSK signals. Demodulation of the MSK signals is performed at base-band other than at IF frequencies. A digital signal processor is preferably used.

30 Claims, 2 Drawing Sheets

DSP-BASED GMSK COHERENT DETECTOR

TECHNICAL FIELD

This invention relates generally to recovery of binary encoded signals, and particularly to recovery of coherent carrier signal information included therewith.

BACKGROUND ART

The transmission of angle modulated carrier signals having substantially constant amplitude and continuous phase (such as FSK, MSK, and GMSK signals), and of similar signals having nonconstant amplitudes, to convey binary data over a radio frequency communication resource is well understood in the art. Such binary signals are typically detected through use of coherent signal detectors that use the phase of the signalling tones to facilitate detection of the transmitted bits. This type of receiver usually includes two parts; a first portion that extracts the bit clock and phase of the signalling tones, and a detector that uses the extracted signal phase.

Digital signal processors (DSPs) are also known in the art, and provide a number of significant advantages in radio design. A need exists, however, for a satisfactory DSP-based GMSK coherent detector for use with binary data transmissions.

SUMMARY OF THE INVENTION

The need for a DSP-based GMSK detector is met by the device disclosed herein. Accordingly, there is provided a GMSK detector which demodulates a GMSK signal at base-band frequencies using digital signal processing techniques, rather than demodulating the GMSK signals at IF frequencies.

GMSK in-phase and phase quadrature signals embedded in an FM signal are first generated from an IF frequency and frequency shifted down to baseband. The baseband in-phase and phase quadrature signal components are digitized and coupled to a digital signal processor, (DSP) where the clock and data signals are recovered.

The digital signal processor receives two signals, an in-phase component and a phase quadrature component and recovers from these a coherent carrier error signal from these two components. The correction signal is derived from the in-phase coherent carrier signal and the quadrature carrier signal to produce a correction signal representative of a correction angle required to demodulate the GMSK. The correction signal is used to demodulate the in-phase and quadrature signals at baseband to produce the data and clock signals which are thereafter digitally decoded.

In one embodiment, a delay element is incorporated to accommodate for certain types of fading of the receive signal as the receiver travels through various geographic areas.

DETAILED DESCRIPTION OF THE PREFERRED EMBODIMENT

Figure 1:
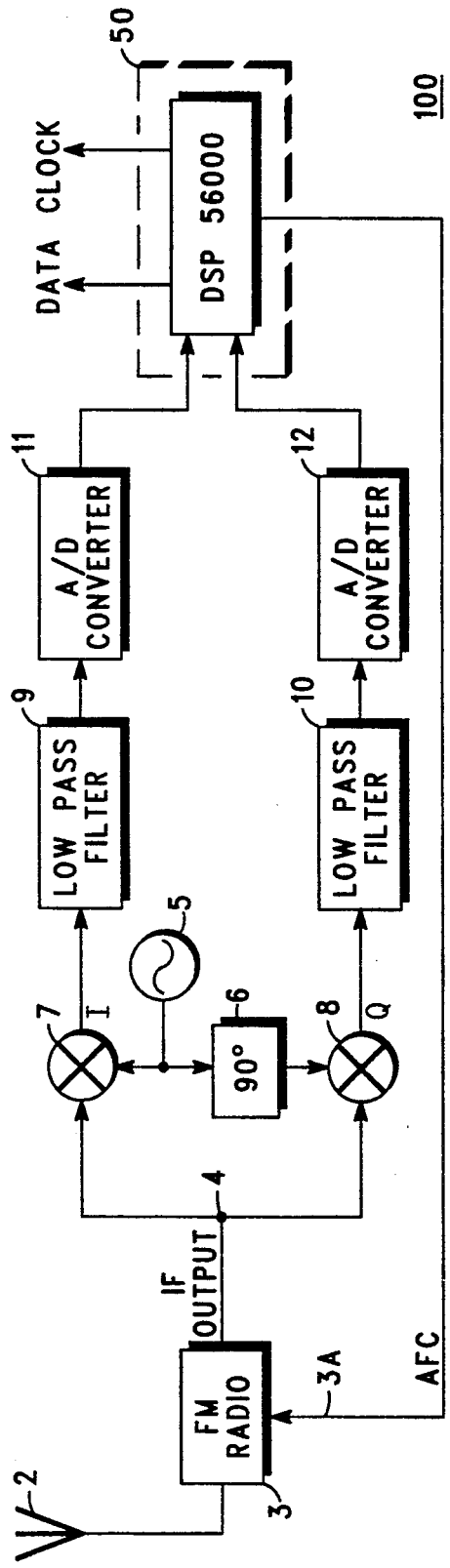
FIG. 1 shows a DSP based GMSK receiver.

Referring to FIG. 1, there is shown an improved GMSK receiver (100). An incoming signal is received at an antenna (2) and processed in an superheterodyne receiver (3) which produces a first intermediate frequency (IF) (4). The IF (4) is coupled to two multipliers (7 and 8) which are used to produce an in-phase base-band signal and a phase-quadrature base-band signal.

The first multiplier (7) receives the IF (4) and multiplies it by a signal obtained from a local oscillator (5) running at the IF frequency. A product of the multiplication of the modulated IF and the IF oscillator frequency is a DC or baseband in-phase signal (I) of the GMSK modulating data stream.

A base-band phase quadrature signal is produced by multiplying the IF by a ninety degree shifted signal from the local oscillator (5). The local oscillator (5) is passed through a phase shifter (6) which phase shifts the output of the local oscillator (5) 90 degrees. The output of the phase shifter (6) is coupled to a second multiplier (8) which multiplies the IF signal (4) by the phase shifted local oscillator frequency to produce a phase quadrature signal (Q) of the IF frequency as shown.

Both the I and Q signals are low-pass filtered by separate low pass filters (9 and 10) to permit digitazation of these signals by analog to digital converters (11 and 12).

The outputs of analog to digital converters (11 and 12) are passed to a digital signal processor (50) which performs the base-band demodulation of the two digitized in-phase and quadrature components.

The DSP (50) produces a data signal and a clock signal which is the desired demodulated information. The DSP (50) also provides an AFC control back to the superheterodyne receiver front-end required to permit the radio to stay on frequency.

Figure 2:
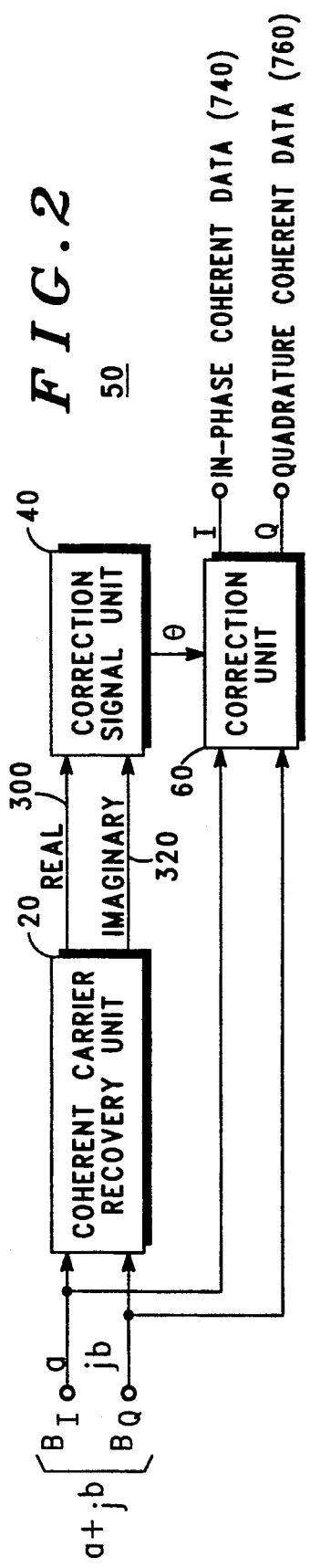
FIG. 2 shows the functions performed by a digital signal processor to demodulate at base-band the GMSK signal.
Figure 3:
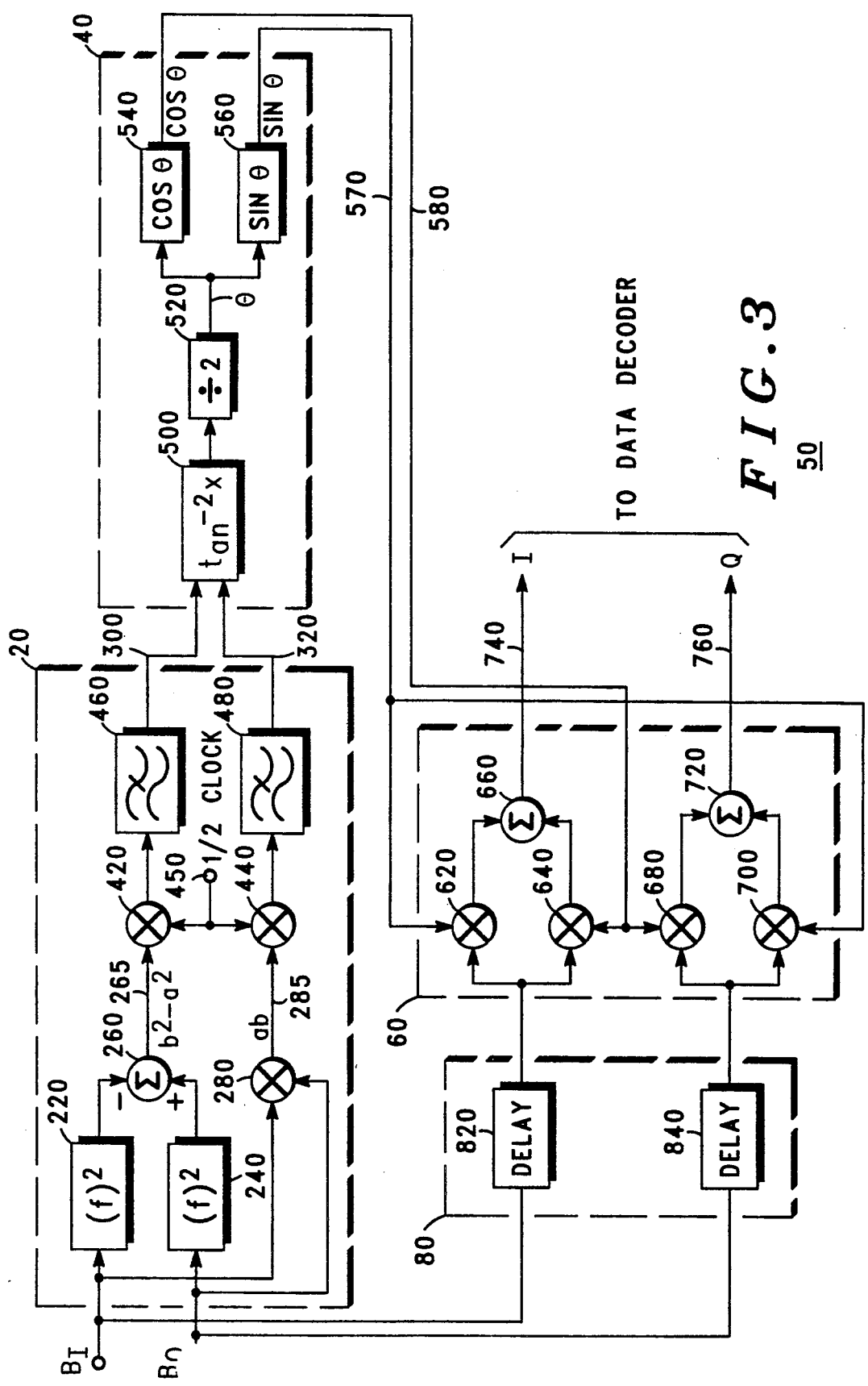
FIG. 3 shows a detailed break-down of the functions performed by the elements shown in FIG. 2.

Referring now to FIG. 2, there is shown a block diagram of the functions performed by the DSP (50) to demodulate the base-band GMSK signal. A first stage in the demodulator is a coherent carrier recovery unit (20) which receives the digitized base-band in-phase component ($B_I$) and the base-band quadrature component ($B_Q$) and produces two new signals (300 and 320) which represent the magnitude of the real (300 and 320) which represent the magnitude of the real (300) and imaginary components (320) of the base-band in-phase and base-band quadrature carrier signals, ($B_I$ and $B_Q$ respectively). The coherent carrier recovery unit (20) in the preferred embodiment, as shown in FIG. 3, squares the two base-band signals, (220 and 240,) and calculates the difference (by element 260) between the two squared signals to yield the in-phase component (265) of the squared signal (b2−a2). (Element 260 is a substractor and functionally calculates the difference between the two signals squared by squaring functions 220 and 240.) It also takes the base-band in-phase, ($B_I$) and base-band quadrature ($B_Q$) components and multiplies these two together (280, shown in FIG. 3) to yield the imaginary component, ab, (285) of the squared signal, (265 also shown in FIG. 3).

The in-phase (265) and imaginary (285) components of the squared signal are both multiplied by a ½ clock signal, (450) and (thereafter) low-pass filtered, (460 and 480) to yield the real and imaginary coherent carrier components, (300 and 320 respectively). The ½ clock signal is derived from the base-band GMSK using other circuits not shown.

The correction signal unit (40) receives the real and imaginary coherent carrier signal components, (300 and 320) and produces a correction factor signal, (theta). The correction factor signal, (theta) is indicative of the angle between the in-phase and quadrature components of the GMSK signal from a reference coordinate system, orthogonal real and imaginary axes representing the phase angle between the I and Q signals of a GMSK signal.

The correction factor signal, (theta) from the correction signal unit (40) is used in a correction unit (60) to demodulate the base-band in-phase and base-band quadrature signals, ($B_I$ and $B_Q$) to yield an in-phase coherent data signal and a quadrature coherent data signal as shown.

Referring now to FIG. 3, there is shown in greater detail the functions performed in a digital signal processor GMSK coherent detector (50) as shown in FIG. 2. The base-band in-phase and base-band quadrature signals, ($B_I$ and $B_Q$) are received at the coherent carrier recovery unit (20) as shown. The base-band in phase and base-band quadrature signals ($B_I$ and $B_Q$) are separately squared in squaring functions (220 and 240). The output of these two squaring functions are combined in a subtracter (260) to yield a signal representative of the magnitude of the real components of the GMSK signal (265). The base-band in-phase signals as well as the base-band phase quadrature signals ($B_I$ and $B_Q$) are also multiplied together in a multiplier (280) to produce a signal that is the magnitude of the imaginary component of the GMSK signal, (285). The imaginary portion of the two input signals (285) and the real portion (265) are multiplied by a ½ clock signal (450) in two multipliers (420 and 440) the outputs of which are low pass filtered (460 and 480) to yield the phase coherent carrier signal. These real and imaginary components (300 and 320) are coupled to the correction signal unit (40) as shown.

The outputs of the multipliers (420 and 440), which are passed through low pass filters (460 and 480), yield two signals equal to the sine and cosine respectively of the angle between the base-band in-phase and the base-band phase quadrature components.

The signals output from low pass filters (460 and 480) being the sine and cosine representations of a reference angle, are passed to an arc tangent calculator (500) in the correction signal unit (40). The arc tangent calculator (500) yields a signal which represents the angle between the base-band information signal and the reference axes used to demodulate GMSK. The output of the arc tangent calculator (500) is coupled to a divider circuit (520) which divides the angle rendered by the arc tangent circuit by two. The divider circuit (520) is required because the squaring functions performed in the coherent carrier recovering unit (20) generates a frequency twice that of the desired signal. The output of the divider circuit (520) yields a phase angle (theta) which is a correction factor required to demodulate the base-band in-phase and the base-band quadrature signals.

Theta in the correction signal unit (40) has its cosine and sine calculated by cosine and sine circuits (540 and 560) to yield two correction signals, cosine theta and sine theta (570 and 580) respectively.

The sine theta and cosine theta correction signals are coupled to the correction unit (60) which takes the base-band in-phase and base-band phase quadrature signals ($B_I$ and $B_Q$) and processes these signals together to yield the in-phase data signal (I) and the phase quadrature data signals, (Q). The base-band in-phase signal component is multiplied by sine theta in a first multiplier (620). The base-band phase quadrature component is multiplied by the cosine theta correction signal in another multiplier (640). The outputs of these two multipliers (620) and (640) are combined in a summer (660) which yields the in-phase signal (I,740).

The base-band in-phase signal ($B_I$) is also multiplied by cosine theta in the multiplier (680). The base-band phase quadrature signal ($B_Q$) is also multiplied by sine theta by the multiplier (700) as shown. The output of multiplier (680) and (700) are both added in the summer (720) which yields the phase quadrature signal component (Q, 760) as shown.

In some applications a delay circuit (80) inserted between the input of the base-band in-phase and base-band quadrature components and the correction unit (60) may be required to accommodate Rayleigh fading, a phenomenon frequently observed in land mobile radio applications of GMSK demodulation. The delay units (820 and 840) respectively may be shift registers, processors, or other circuits capable of temporarily delaying the signals into the correction unit (60). In one embodiment the delay provided by the delay circuits (820 and 840) equal the propagation delay through the coherent carrier recovery unit (20) and the correction signal unit (40). Other delay factors might be contemplated as well.

In the preferred embodiment, the coherent carrier recovery unit (20) squared the baseband in-phase and phase-quadrature signals ($B_I$ and $B_Q$) to recover the phase coherent carrier (460 and 480). Squaring the baseband signals in the coherent carrier recovery unit (20) necessitates dividing the output of the arctangent calculator (500) by a factor of two to cancel-out the frequency doubling that results when sine (or cosine) functions are squared.

Alternate embodiments of the invention would include coherent carrier recovery units that factor or raise the incoming baseband signals to other mathematical powers. (For example, the incoming baseband signals might be raised to the fourth power in the coherent carrier recovery unit (20).) Raising the baseband signals to other powers will change the division required of the divider circuit (520) accordingly. (If the baseband signals are raised to the fourth power, the correction signal unit (40) will have to divide the output of the arctangent calculator by four.) Raising the baseband signals to other powers however might preclude the requirement of multiplying the real and imaginary components (265 and 285) by ½ clock signals as shown.

What is claimed is:

1. A detector for detecting in-phase and quadrature components of an information signal comprising:
   coherent carrier recovery means for receiving first and second signals and for providing a coherent carrier signal related thereto by factoring said first and second signals and by multiplying said first and second signals after said factoring by a clock signal thereby providing in-phase and quadrature coherent carrier signals:
   correction signal means for receiving at least said coherent carrier signals and providing a correction signal based at least in part upon said coherent carrier signals; and correction means for receiving the first and second signals and receiving said correction signal and producing a detected in-phase and quadrature components.

2. The detector of claim 1 wherein said first and second signals are baseband signals.

3. The detector of claim 1 wherein said first and second signals are IF signals.

4. The detector of claim 1 including a delay means coupled between said first and second signals and said correction means for temporally delaying said first and second signals to said correction means.

5. The detector of claim 1 wherein said means for providing in-phase and quadrature coherent carrier signals by factoring the first and second signals includes means for mathematically squaring said first and second signals and providing in-phase and quadrature portions of said first and second signals.

6. The detector of claim 1 wherein the correction signal means includes means for multiplying said in-phase coherent and quadrature coherent signals by said clock signal producing, respectively, an in-phase coherent carrier component and a quadrature coherent carrier component.

7. The detector of claim 6 wherein the correction signal means includes means for low-pass filtering the in-phase coherent carrier component producing a sine signal and means for low-pass filtering the quadrature coherent carrier component producing a cosine signal.

8. The detector of claim 7 wherein the correction signal means includes means for calculating the arctangent of the sine signal divided by the cosine signal producing a first correction angle signal.

9. The detector of claim 8 including means for dividing said correction angle signal by a factor.

10. The detector of claim 9 wherein the means for dividing said correction angle signal by a factor divides said signal by two producing a second correction angle signal.

11. The detector of claim 8 including means for calculating the cosine and sine of said correction angle producing first and second correction signals respectively.

12. The detector of claim 1 wherein the correction signal means includes means for multiplying said first signal by a first correction signal providing a first product signal and means for multiplying said second signal by a second correction signal providing a second product signal.

13. The detector of claim 12 including means for summing said first product signal with said second product signal providing the in-phase corrected data signal.

14. The detector of claim 1 wherein the correction signal means includes means for multiplying said second signal by a first correction signal providing a third product signal and means for multiplying said second signal by a second correction signal providing a fourth product signal.

15. The detector of claim 14 including means for summing said third and fourth product signals providing the quadrature corrected data signal.

16. A method of detecting in-phase and quadrature components of an information signal comprising:

receiving first and second signals and providing a coherent carrier signal related thereto by factoring said first and second signals and multiplying said first and second signals after said factoring by a clock signal thereby producing an in-phase coherent carrier component and a quadrature coherent carrier component signals;

providing a correction signal based at least in part upon said coherent carrier signals;

producing a detected in-phase and quadrature components from said correction signal and said first and second signals.

17. The method of claim 16 wherein said first and second signals are baseband signals.

18. The method of claim 16 wherein said first and second signals are IF signals.

19. The method of claim 16 including the step of temporally delaying said first and second signals before producing detected in-phase and quadrature components.

20. The method of claim 16 further including the step of mathematically squaring said first and second signals and providing in-phase and quadrature portions of said first and second signals.

21. The method of claim 16 further including the step of multiplying said in-phase coherent and quadrature coherent signals by said clock signal producing, respectively, an in-phase coherent carrier component and a quadrature coherent carrier component.

22. The method of claim 21 further including the step of low-pass filtering the in-phase coherent carrier component producing a sine signal and low-pass filtering the quadrature coherent carrier component producing a cosine signal.

23. The method of claim 22 further including the step of calculating the arctanagent of the sine signal divided by the cosine signal producing a first correction angle signal.

24. The method of claim 23 including the step of dividing said correction angle signal by a factor.

25. The method of claim 24 including the step of dividing said correction angle signal by a factor of two producing a second correction angle signal.

26. The method of claim 23 including the step of calculating the cosine and sine of said correction angle producing first and second correction signals respectively.

27. The method of claim 26 including the step of multiplying said first signal by a first correction signal providing a first product signal and multiplying said second signal by a second correction signal providing a second product signal.

28. The method of claim 27 including the step of summing said first product signal with said second product signal providing the in-phase corrected data signal.

29. The method of claim 26 including the step of multiplying said second signal by a first correction signal providing a third product signal and multiplying said second signal by a second correction signal providing a fourth product signal.

30. The method of claim 29 including the step of summing said third and fourth product signals providing the quadrature corrected data signal.

* * * * *